US012681254B2

(12) United States Patent
Kelly et al.

(10) Patent No.: US 12,681,254 B2
(45) Date of Patent: Jul. 14, 2026

(54) HIGH DENSITY FIBER MANAGEMENT SYSTEM

(71) Applicant: Panduit Corp., Tinley Park, IL (US)

(72) Inventors: Brian L. Kelly, Oak Forest, IL (US);
Kevin A. Marley, Joliet, IL (US);
Jerry A. Wiltjer, Frankfort, IL (US);
Richard A Marcus, Manteno, IL (US);
Matthew C. Isoda, Chicago, IL (US);
Federick R. Wilson, Bolingbrook, IL
(US)

(73) Assignee: Panduit Corp., Tinley Park, IL (US)

( * ) Notice: Subject to any disclaimer, the term of this
patent is extended or adjusted under 35
U.S.C. 154(b) by 275 days.

(21) Appl. No.: 18/535,278

(22) Filed: Dec. 11, 2023

(65) Prior Publication Data

US 2025/0189746 A1 Jun. 12, 2025

(51) Int. Cl.
G02B 6/44 (2006.01)

(52) U.S. Cl.
CPC .................................. G02B 6/4455 (2013.01)

(58) Field of Classification Search
CPC ........................... G02B 6/4455; G02B 6/4452;
G02B 6/44524; G02B 6/44526; G02B
6/4453
See application file for complete search history.

(56) References Cited

U.S. PATENT DOCUMENTS 5,265,187 A * 11/1993 Morin ................... G02B 6/4455
385/135
5,337,400 A * 8/1994 Morin ................. G02B 6/44528
385/135
5,717,810 A * 2/1998 Wheeler ................ H04Q 1/023
385/59
6,418,262 B1 * 7/2002 Puetz ................. G02B 6/44528
385/53
6,647,197 B1 * 11/2003 Marrs ................... G02B 6/4455
385/134
9,690,065 B2 * 6/2017 Wiltjer ................. G02B 6/4471
2006/0018622 A1 * 1/2006 Caveney ................ H04Q 1/131
385/135

(Continued)

FOREIGN PATENT DOCUMENTS

CA 2081608 C * 5/1998 .......... G02B 6/4452
CN 102138093 A * 7/2011 .......... G02B 6/4453

(Continued)

OTHER PUBLICATIONS

CA_2081608_C (English translation) (Year: 1998).*
CN_102138093_A (English translation) (Year: 2011).*
CN_105074526_A (English translation) (Year: 2015).*

*Primary Examiner* — Thomas A Hollweg
*Assistant Examiner* — Mary A El-Shammaa
(74) *Attorney, Agent, or Firm* — Peter S. Lee; Christopher
S. Clancy; James H. Williams

(57) ABSTRACT

A fiber management system includes a tray and a plurality of
cassettes. The tray includes a set of rails and a tray body that
is slidable along the set of rails. The tray body has a
longitudinal portion extending in parallel with the set of rails
and a lateral portion extending with an opening that provides
access to the tray. Each of the cassettes has a plurality of
ports at a first side of the cassette to support fiber optic
connectors, and the plurality of cassettes are arranged on the
tray with the first sides facing at least a portion of the
longitudinal portion.

18 Claims, 12 Drawing Sheets

(56)                References Cited

U.S. PATENT DOCUMENTS

| | | | |
|---|---|---|---|
| 2009/0245743 A1 | 10/2009 | Cote et al. | |
| 2011/0268406 A1 * | 11/2011 | Giraud | G02B 6/44528 |
| | | | 385/135 |
| 2012/0114295 A1 * | 5/2012 | Guzzo | G02B 6/44528 |
| | | | 385/135 |
| 2014/0248028 A1 * | 9/2014 | Campbell | G02B 6/4453 |
| | | | 385/135 |
| 2015/0362691 A1 * | 12/2015 | Montgelas | H01R 13/73 |
| | | | 29/428 |
| 2016/0033732 A1 * | 2/2016 | Giraud | G02B 6/44528 |
| | | | 385/135 |
| 2016/0085042 A1 * | 3/2016 | Lewis | G02B 6/4453 |
| | | | 385/135 |
| 2019/0004268 A1 | 1/2019 | Vogel | |

FOREIGN PATENT DOCUMENTS

| | | | | |
|---|---|---|---|---|
| CN | 105074526 A | * | 11/2015 | G02B 6/428 |
| WO | WO-2022178310 A1 | * | 8/2022 | H05K 7/1489 |

* cited by examiner

HIGH DENSITY FIBER MANAGEMENT SYSTEM

TECHNICAL FIELD

The present disclosure relates to a fiber management system to manage and/or route fiber cables within a known dimensional area.

BACKGROUND

The statements in this section merely provide background information related to the present disclosure and may not constitute prior art.

Having less signal loss than wire cables and immune to electromagnetic interference, optical fibers are often used for high bandwidth, long distance communication. One of the primary functions of a datacenter is to provide connections between incoming and outgoing optical fiber connections. For example, a fiber management system may be used to provide fiber cable interconnections within a datacenter environment, and generally includes a cabinet with an industry standard known dimensional area, such as rack unit (RU) of space, multiple trays provided in the cabinet, and multiples cassettes provided at each tray to provide fiber cable connections.

SUMMARY

This section provides a general summary of the disclosure and is not a comprehensive disclosure of its full scope or all of its features.

In one embodiment, the present disclosure is directed to a fiber management system including a tray and a plurality of cassettes. The tray includes a set of rails and a tray body that is slidable along the set of rails. The tray body has a longitudinal portion extending in parallel with the set of rails and a lateral portion extending with an opening that provides access to the tray. Each of the cassettes has a plurality of ports at a first side of the cassette to support fiber optic connectors, and the plurality of cassettes are arranged on the tray with the first sides facing at least a portion of the longitudinal portion.

In one embodiment, the present disclosure is directed to a fiber management system that includes a cabinet defining an opening, a tray, and a plurality of cassettes. The tray includes a set of rails, and a tray body slidable along the set of rails to slide beyond the opening. Each of the cassettes has a plurality of ports at a first side of the cassette, and the plurality of cassettes are arranged on the tray forming at least one column provided along a width of the tray that is parallel to the opening and a plurality of rows provided along a depth of the tray.

In one embodiment, the present disclosure is directed to a fiber management system including a cabinet defining an opening, a tray, and a plurality of cassettes. The tray includes a set of rails, and a tray body slidable along the set of rails to slide beyond the opening. Each of the cassettes has a plurality of ports at a first side of the cassette, and the plurality of cassettes are arranged on the tray with the first sides facing away from the opening. The plurality of cassettes includes a first array of cassettes and a second array of cassettes arranged on the tray opposite of the first array of cassettes with a gap defined therebetween to route cables to be connected.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1A:
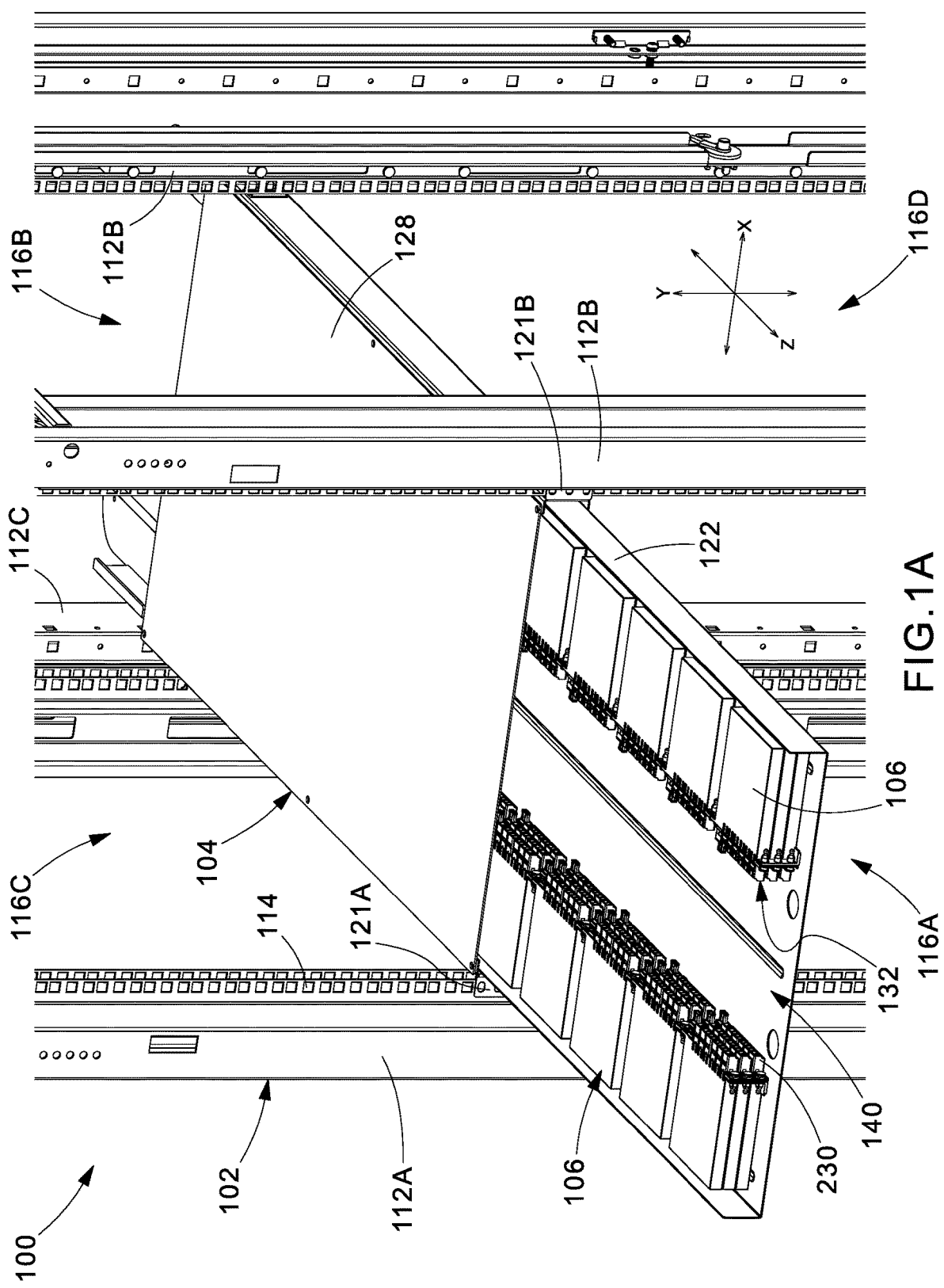
FIG. 1A illustrates a perspective partial view of a fiber management system including a tray supporting a plurality of cassettes in accordance with the present disclosure.

The following description is merely exemplary in nature and is not intended to limit the present disclosure, application, or uses. It should be understood that throughout the drawings, corresponding reference numerals indicate like or corresponding parts and features.

Traditional fiber management systems arrange cassettes on a tray along a width of a cabinet, so that the side of the cassette having the connectors for the fiber cable faces a front or rear opening of the cabinet. With the current configuration of the cassettes, the number of connectors available for a single a rack unit (RU) space is limited by the width and height of the RU space, which is standardized to a width of 17.75 inches (45.085 centimeters), or a width of 19 inches (48.260 centimeters), and a height of 1.75 inches (4.445 centimeters).

The present disclosure discloses, at least, a fiber management system that includes a tray and cassettes, where the connectors/ports of the cassettes are directed toward a longitudinal portion of the tray or stated differently, a depth of the tray. With multiple cassettes arranged along the depth of tray, which is generally longer than the width of the tray and RU width, the fiber management system may include more cassettes, thereby increasing the number of connectors available and, possibly, reducing the number of cabinets needed. These and other features of the fiber management system of the present disclosure are provided herein.

Figure 1B:
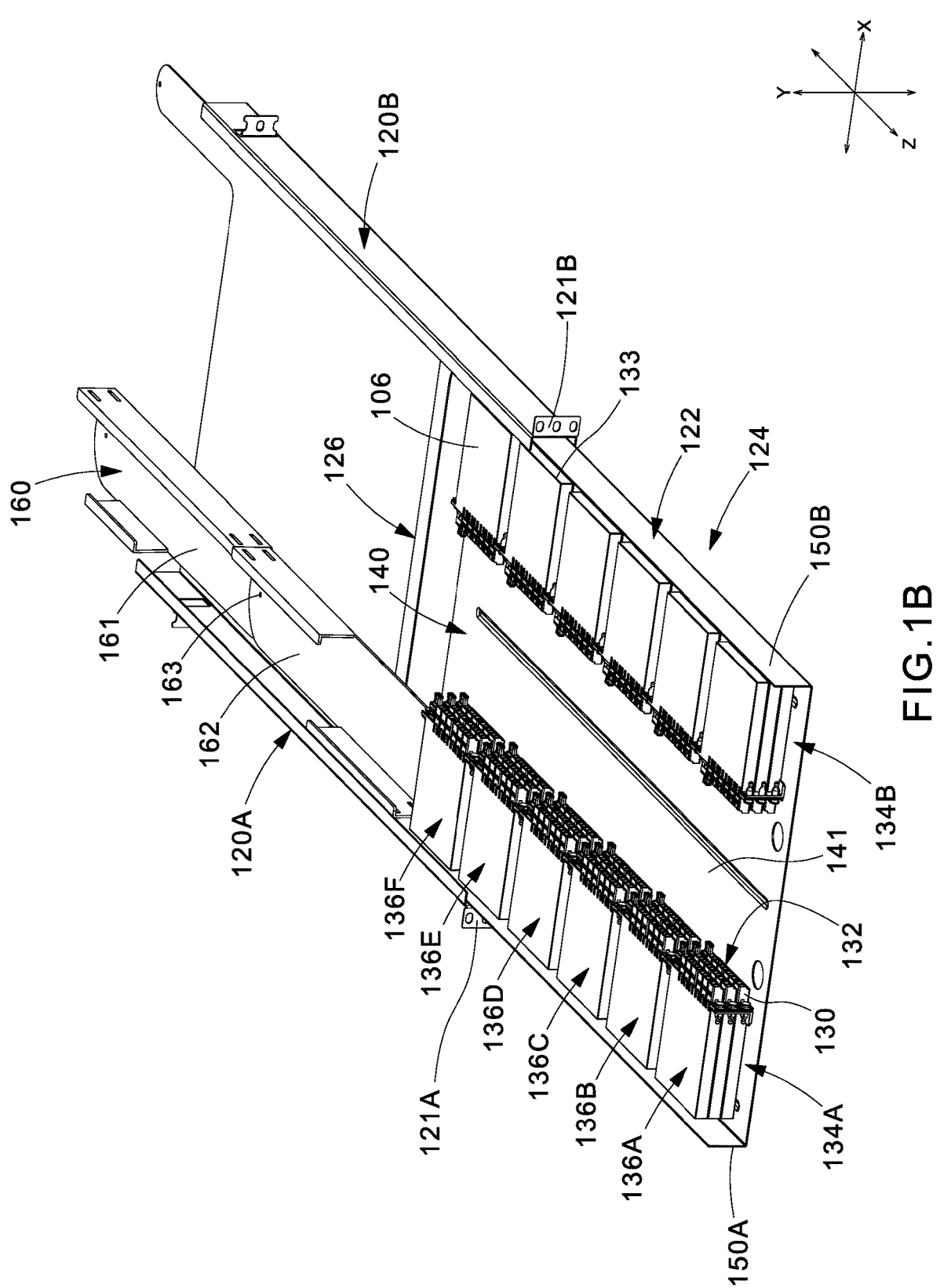
FIG. 1B illustrates a perspective view of the tray of FIG. 1A in accordance with the present disclosure.

Referring to FIGS. 1A and 1B, a fiber management system 100 includes a cabinet 102, a tray 104, and a plurality of cassettes 106 provided on the tray 104. In FIG. 1A, the doors and panels of the cabinet 102 are removed to provide an unobstructed view of the tray 104 and arrangement of the cassettes 106. While only one tray 104 is illustrated, the fiber management system 100 may hold one or more trays 104, with each tray 104 having the plurality of cassettes 106. The number of cassettes 106 distributed on the trays 104 may be the same or may be different.

Among other components, the cabinet 102 includes a frame having multiple vertical beams 112A, 112B, 112C, and 112D (collectively "beams 112") that define a series of tray attachment holes 114 that the tray 104 is attachable to and detachable from via mounting flanges 121A and 121B (collectively "mounting flanges" 121). In one form, the vertical beams 112 are arranged to define a front opening 116A between beams 112A, 112B for a front door assembly (not shown); a rear opening 116B between beams 112C, 112D for a back door assembly (not shown); and a pair of side openings 116C and 116D between beams 112A, 112C and beams 112B, 112D, respectively, for a pair of side panel assemblies (not shown). Together, the beams 112, doors, and side panels form an enclosure for holding the tray 104. While not illustrated, in some variations, the cabinet 102 further includes lateral and longitudinal beams at the top portion of the vertical beams 112 to form a top opening for a top panel assembly, and at the bottom portion of the vertical beams 112 to form a bottom opening for a bottom panel assembly.

In one embodiment, the tray 104 is configured to be slidable with respect to the cabinet 102 so as to extend past the front opening 116A and/or, in some variations, the rear opening 116B to provide access to components provided on the tray 104 such as the cassettes 106. The tray 104 includes a set of rails 120A and 120B (collectively "rails 120") including the mounting flanges 121 for attaching to the cabinet 102, and a tray body 122 slidable along the rails 120. While two rails 120 are illustrated, the set of rails 120 may include two or more rails. For example, a third rail may be provided in between rails 120A and 120B to provide additional slide support.

The tray body 122 includes a tray floor 141, and also includes a longitudinal portion 124 defining a depth of the tray 104 and a lateral portion 126 orthogonal to the longitudinal portion 124 and defining a width of the tray 104. The longitudinal portion 124 extends parallel with the rails 120 along a Z-axis of an X-Y-Z orthogonal coordinate system, and the lateral portion 126 aligns with the front opening 116A and the rear opening 116B extending along the X-axis to provide access to the tray 104 via the front opening and/or the rear opening 116A, 116B. The longitudinal portion 124 may be used to describe side walls at the outer widths of the tray 104 that extend up from the tray floor 141.

In some variations, the tray 104 may further include a cover 128 that is connected to the cabinet 102 to protect the components (e.g., cassettes 106, cables (not shown)) on the tray body 122 from environmental conditions and to manage cables entering/leaving the tray. The cover 128 may also be omitted from the tray 104 according to other embodiments. As shown in FIG. 1B, the fiber management system 100 may also include an articulating cable routing arm 160 for routing cables to the tray 104. The articulating cable routing arm 160 may be comprised of two or more channels (e.g., first channel 161 and second channel 162), where an articulating mechanism 163 is provided between the first channel 161 and the second channel 162 to enable the articulating cable routing arm 160 to bend/fold about the articulating mechanism and extend in length as the tray 104 is pulled out the cabinet 102, and also retract in length as the tray 104 is pushed back into the cabinet 102. The articulating cable routing arm 160 may carry cables into/out the tray 104 via the rear opening 116B.

In one form, each cassette 106 has a plurality of ports 130 at a first side 132 of the cassette 106 to connect to fiber optic cables via connectors/adaptors provided at the ports 130. In a non-limiting example, the cassettes 106 may include multi-fiber-push-on (MPO) style connectors, multi-fiber termination push-on (MTP) style connectors, and/or little connector (LC) distribution type connectors ("LC" may also be known as Lucent Connector). The connectors may be arranged in various suitable ways on the cassettes 106 such that, an entry connector and distribution connectors may be provided on the same side of the cassette 106 or on different sides of the cassette 106.

In one embodiment, the cassettes 106 are distributed along the depth of the tray 104, and may form at least one column 134A, 134B (collectively "columns 134") provided along the lateral portion and a plurality of rows 136A, 136B, 136C, 136D, 136E, 136F (collectively "rows 136") provided along the longitudinal portion 124 of the tray 104. With the cassettes 106 distributed along the longitudinal portion (i.e., along the depth), the first sides 132 of the cassettes 106 are orientated to face at least a portion of the longitudinal portion 124. Stated differently, the first sides 132 of the cassettes 106 may face away (i.e., face a different direction) from the front and rear openings 116A, 116B.

In a non-limiting example, FIG. 1B illustrates 2 columns and 6 rows of cassettes 106 oriented to face inwards with their first sides 132 facing towards each other along the x-axis, which in turn results in the accommodation of more cassettes 106 within the tray 104 overall than a more traditional orientation where the first sides 132 of the cassettes 106 were orientated to face out the front opening 116A of the tray 104. This is because the front opening 116A is limited by the known dimensions of the standard RU, whereas the depth of the tray 104 along the z-axis is not defined by the RU dimensions and may be lengthened and/or fully utilized to accommodate more cassettes 106. For example, the depth of the tray 104 shown in FIG. 1B may be up to 35 inches, or longer.

The embodiments disclosed herein will explore different solutions for increasing available fiber optic connection density by orienting the cassettes 106 to be populated along the depth of the z-axis instead of the more traditional orientation to be front facing out the front opening 116A.

Figure 2A:
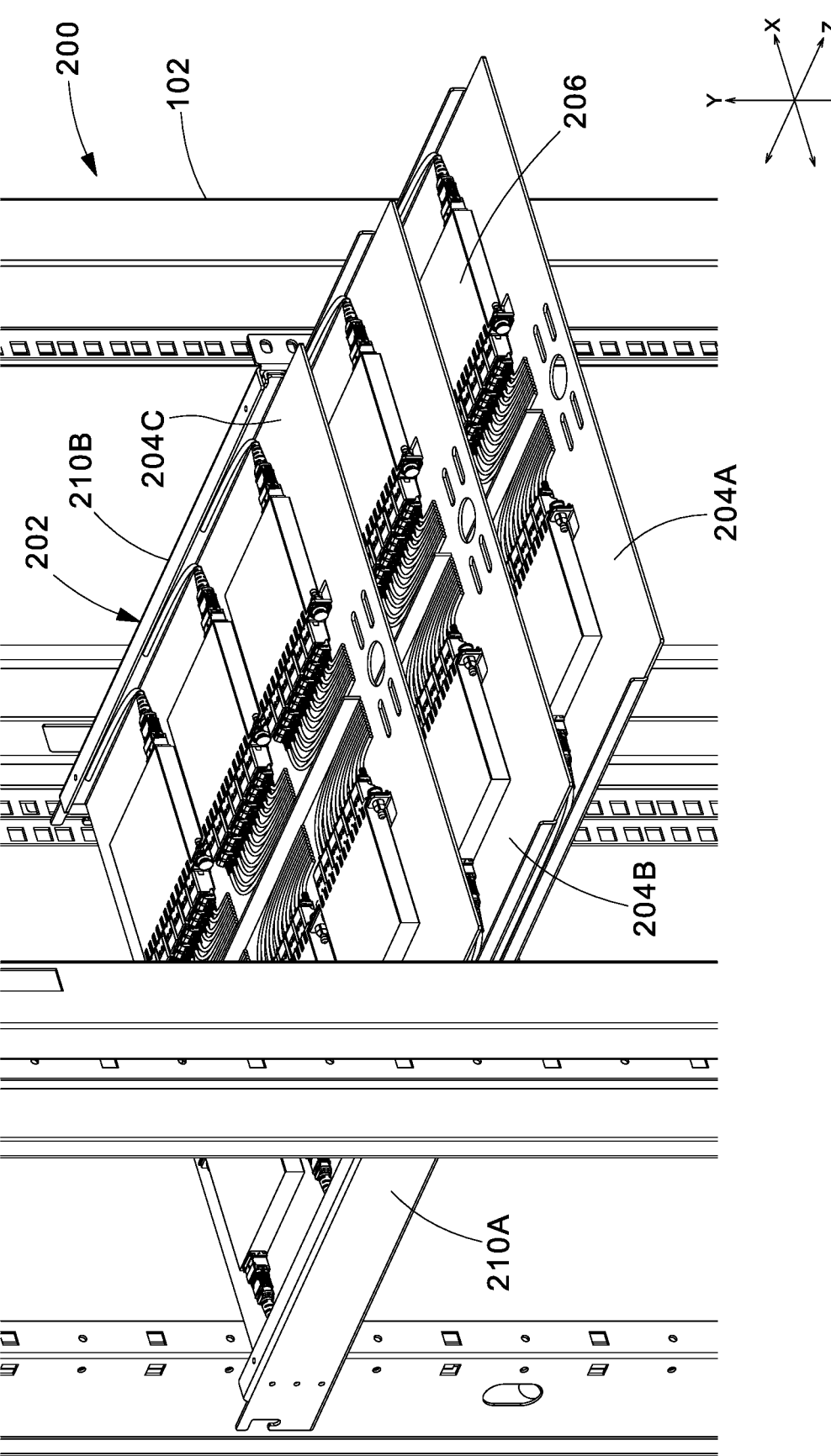
FIG. 2A illustrates a perspective partial view of a fiber management system including a tray having a plurality of tray bodies, each supporting a single layer of cassettes in accordance with the present disclosure.
Figure 2B:
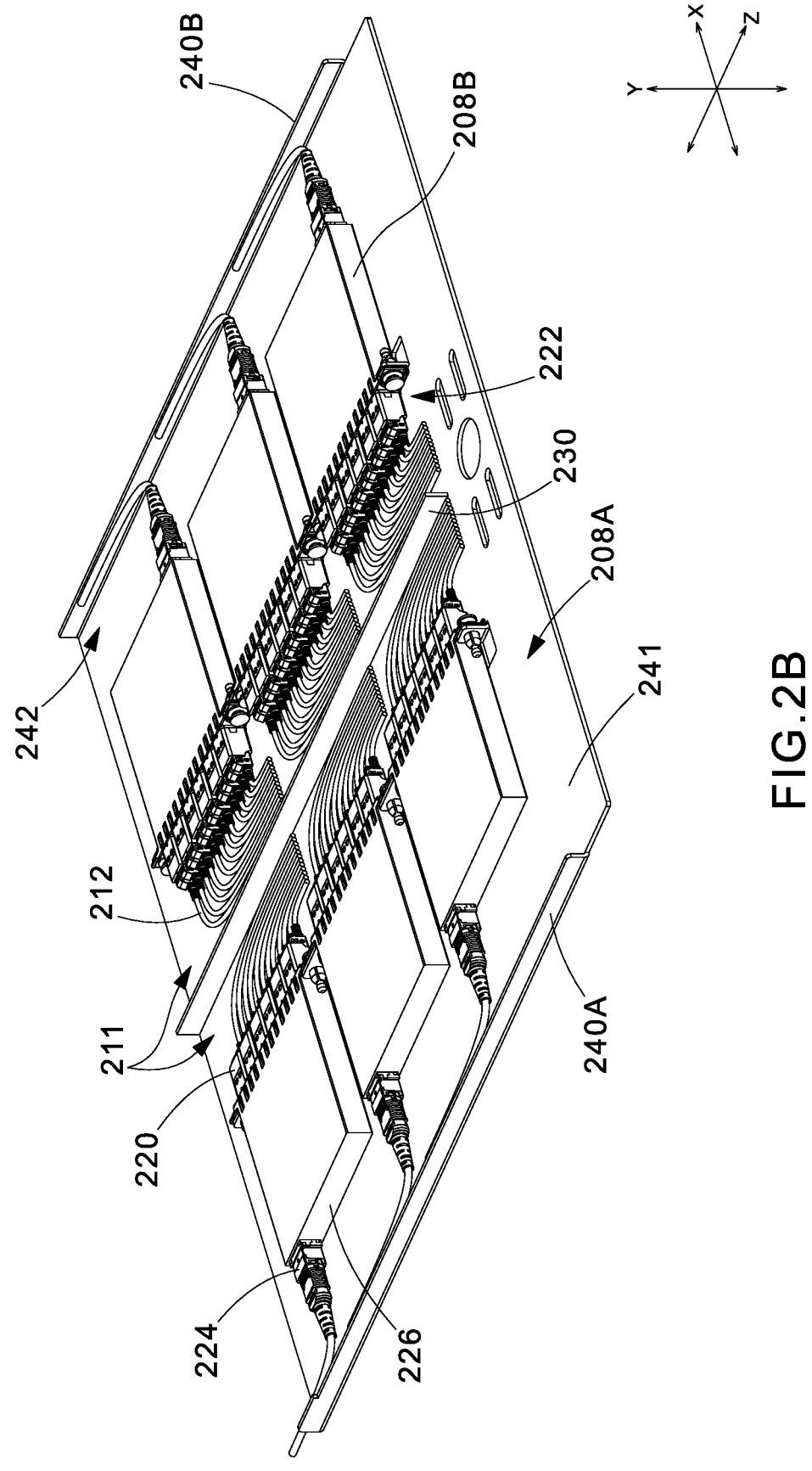
FIG. 2B illustrates a perspective view of a tray body of FIG. 2A in accordance with the present disclosure.

In the embodiment illustrated in FIG. 1A and FIG. 1B, the cassettes 106 are arranged in multiple arrays, each being formed by multiple cassettes 106, where the arrays are separated by a gap 140 along the tray floor 141. In a non-limiting example, the cassettes 106 provided in the column 134A forms a first array of cassettes 106 and the cassettes 106 provided in the column 134B forms a second array of cassettes 106, where the second array is arranged on the tray 104 opposite of the first array with a gap 140 defined therebetween. The fiber optic cables connected to the first sides 132 of the cassettes 106 may be routed through the gap 140 towards the front opening 116A and/or the rear opening 116B, where FIGS. 2A and 2B show exemplary illustrations of a similar fiber management system 200 including cables 212 being routed via a gap 211 along a tray floor 241.

In one embodiment, the height of the tray body 122 may be configured to be higher than one RU height to provide a stacked arrangement of the cassettes 106 into subunits including cassettes that are stacked on top of each other. For example, in FIGS. 1A and 1B, the cassettes 106 are stacked on the tray body 122 forming twelve cassette stacks, each stack being a subunit of up to three (3) cassettes 106 being stacked on top of each other to a maximum height of 1 RU height. This results in the tray 104 having a capacity to hold up to a total of thirty-six (36) cassettes 106 by arranging the cassettes into two arrays of six cassettes 106 each, and then stacking the array of cassettes 106 three layers high. In terms of fiber optic connection capacity, if the ports 130 included duplex LC adapters so that each cassette 106 have a capacity of twelve (12) fiber optic connections, then the fiber optic connection capacity for the tray 104 would be up to 432 fiber optic connections in the one (1) RU front-facing space of the front opening 116A by utilizing the z-axis depth of the tray 104.

While the subunits shown in FIG. 1B include three layers of stacked cassettes, the cassettes 106 may be stacked to form two or more layers of cassettes 106 on the tray 104 depending on a desired cassette/connection density and/or cassette dimensions to stay within the one (1) RU height. Other embodiments may also configure the tray body 122 to be longer, or shorter, in the z-axis to increase, or decrease, a number of cassette rows to result in an increase, or decrease, in cassette/connection capacity for the tray 104.

In some other embodiments, the height of the overall tray may be maintained at one (1) RU height, but the tray may include multiple sliding tray bodies within the one (1) RU height. More particularly, FIGS. 2A and 2B illustrate an exemplary fiber management system 200 that includes a tray 202 having multiple tray bodies 204A, 204B, 204C (collectively "tray body 204"), where each tray body 204 supports a plurality of cassettes 206 positioned along a single cassette layer, which may be used within the cabinet 102 in lieu of or in addition to the tray 104 having the single tray body 122 for the stacked cassettes 106 subunits in the fiber management system 100. In the embodiment shown in FIGS. 2A and 2B, each single cassette layer tray body 204A, 204B, 204C is approximately ⅓ RU in height, such that the three tray bodies 204A, 204B, 204C together take up one (1) RU height. Each tray body 204 is connected to a set of rails 210A, 210B (collectively "rails 210") to be slidable along the Z-axis and slide in and out of the cabinet 102. In this configuration, the cassettes 206 are arranged in a single cassette high layer defining a first array 208A of cassettes 206 and a second array 208B of cassettes 206 opposite to the first array 208A with a gap 211 defined therebetween on the tray floor 241.

Cables 212 connected to the cassettes 206 may be routed in various suitable ways. In a non-limiting example, the cables 212 are routed through the gap 211 and enter/exit the cabinet 102 from the front and/or rear opening 116A, 116B of the cabinet 102. In another example, the cables 212 are routed through the gap 211 to a passage that routes the cable along an underside of the tray 104.

Like the cassette 106, each cassette 206 includes ports 220 on a first side 222 of the cassette 206 to connect to the fiber optic cable. In addition, each cassette 206 includes at least one port 224 on a second side 226 opposite of the first side 222 to connect to one or more cables. For example, the port 224 may be configured for an entry connector (e.g., MPO connector) with the ports 220 on the first side 222 being distribution connectors.

The tray 202 holds a total of eighteen cassettes 206 with six cassettes 206 per tray body 204 and three tray bodies per tray 202 to fill up a one (1) RU height of the tray 202. In terms of fiber optic connection capacity, if the ports 220 included duplex LC adapters so that each cassette 206 has a capacity of up to twelve (12) fiber optic connections, then the fiber optic connection capacity for the tray 202 would be up to 216 fiber optic connections in the one (1) RU front-facing space of the front opening 116A by utilizing the z-axis depth of the tray 202.

This is in comparison to the configuration of tray 104 shown in FIGS. 1A and 1B that holds up to a total of 36 cassettes 106, for a capacity of up to 432 fiber optic connections in the one (1) RU front-facing space of the front opening 116A. While the figures illustrate a specific number of cassettes 106, 206 per tray 104, 202, it should be readily understood that the number of cassettes 106, 206 may vary and should not be limited to the figures.

While the tray 104 is illustrated as having the cassette 106, the tray 104 may include the cassette 206. Similarly, the tray 202 may include the cassette 106. In addition, while the trays 104, 202 are illustrated as having the same type of cassettes (i.e., cassettes 106 or cassettes 206), the tray 104, 202 may include different types of cassettes (e.g., a combination of cassettes 106 and 206 may be provided on the same tray 104, 202).

In some variations, the tray body 204 may include a barrier plate 230 to split the tray body 204 in half along the Z-axis creating a left and right portion of the tray 202. The barrier plate 230 may assist in separating the cables 212 being routed for the first array 208A and the second array 208B of cassettes 206. The barrier plate 230 may also be provided with the tray 104 of FIGS. 1A and 1B.

In one embodiment, an arrangement of the cassettes 106, 206 is dependent on various factors, such as but not limited to, dimensions of the cassettes 106, 206, location of ports on the cassette 106, 206 (e.g., ports provided on front-side only, ports provided on both front-side and back-side, density of ports on a side), and/or dimension of the tray 104, 202 (e.g., length of the tray depth along the z-axis). The following are non-limiting examples of the configuration of cassettes 106, 206 on a tray body 122, 204 that may be combined with one another.

In one arrangement, the cassettes 106, 206 may be provided against at least one of the sides of the tray body 122, 204. In a non-limiting example, with the ports 130 provided on the first side 132 and no ports on a second side 133, the cassettes 106 are arranged close to sides 150A, 150B (collectively "sides 150") of the tray body 122 to have the second side 133 as close to the sides 150 of the tray body 122 since no gap is needed for routing cables between the second side 133 (e.g., "rear-side") of the cassettes 106 and the sides 150 of the tray body 122. Stated differently, the cassettes 106 are arranged to be close to the longitudinal portion 124, so as to be directly adjacent to the longitudinal portion 124 of the tray body (i.e., no cable between the cassettes 106 and the longitudinal portion 124).

Alternatively, in a non-limiting example, the cassettes 206 have ports 220 on the first side 222 as well as ports 224 on the second side 226, and thus, the cassettes 206 are arranged offset from sides 240A, 240B (collectively "sides 240") of the tray body 204 to define a second gap 242 between the second sides 226 (e.g., "rear-side") of the cassettes 206 and the sides 240 of the tray body 204 (i.e., the longitudinal portion of the tray body 204), where cables connected to the second sides 226 of the cassettes 206 are routed through the second gap 242 (see FIGS. 2A and 2B).

In another exemplary embodiment, the cassettes 106 included in the tray 104 may be rotated 180 degrees such that the ports 130 face out towards the sides 150A, 150B of the tray 104 and the second sides 133 of the cassettes in opposing arrays are brought closer together towards the middle of the tray 104, thus narrowing the gap 140. In this configuration, the cables (not shown) coming out from the ports 130 will extend radially outward towards the longitudinal portions 124 of the tray body 122 and run along a portion of the tray floor 141 that follows along the longitudinal portions 124.

In lieu or in addition to the trays 104, 202, the fiber management systems 100, 200 may include a dual-adjacent tray configuration to, for example, manage the cables entering/leaving the fiber management system. Specifically, referring to FIGS. 3A and 3B, a fiber management system 300 includes a tray 302 having a tray body 304 formed by a first tray body 304A and a second tray body 304B arranged adjacent to and separate from the first tray body 304A. The first tray body 304A forms a left side of the tray 302 and the second tray body 304B forms a right side of the tray 302. The first and second tray bodies 304A, 304B are provided on a set of rails 312A, 312B to be independently slidable from one another.

In one form, the tray 302 supports the plurality of cassettes 106 such that a first array 310A of the cassettes 106 is provided on the first tray body 304A and a second array 310B of the cassettes 106 is provided on the second tray body 304B. Similar to FIGS. 1A and 1B, the cassettes 106 are arranged close to outer sides 314A, 314B of the tray bodies 304A, 304B and define a gap 316A, 316B between the first side 132 of the cassettes 106 and inner sides 318A, 318B of the tray bodies 304A, 304B. In some variations, the cables connected to the cassettes 106 may be routed through the gap 316A, 316B. The outer sides 314A, 314B and the inner sides 318A, 318B define a longitudinal portion 323 and thus, the depth of the tray 302.

The dual-adjacent tray configuration separates the array of cassettes 106 and thus, the cables connected to the cassette 106. Accordingly, in a non-limiting example, when the first array 310A of cassettes 106 is accessed by sliding the first tray body 304A, the second array 310B of cassettes 106 are not moved, thereby reducing, or inhibiting movement of the cables connected to the second array 310B.

Figure 3A:
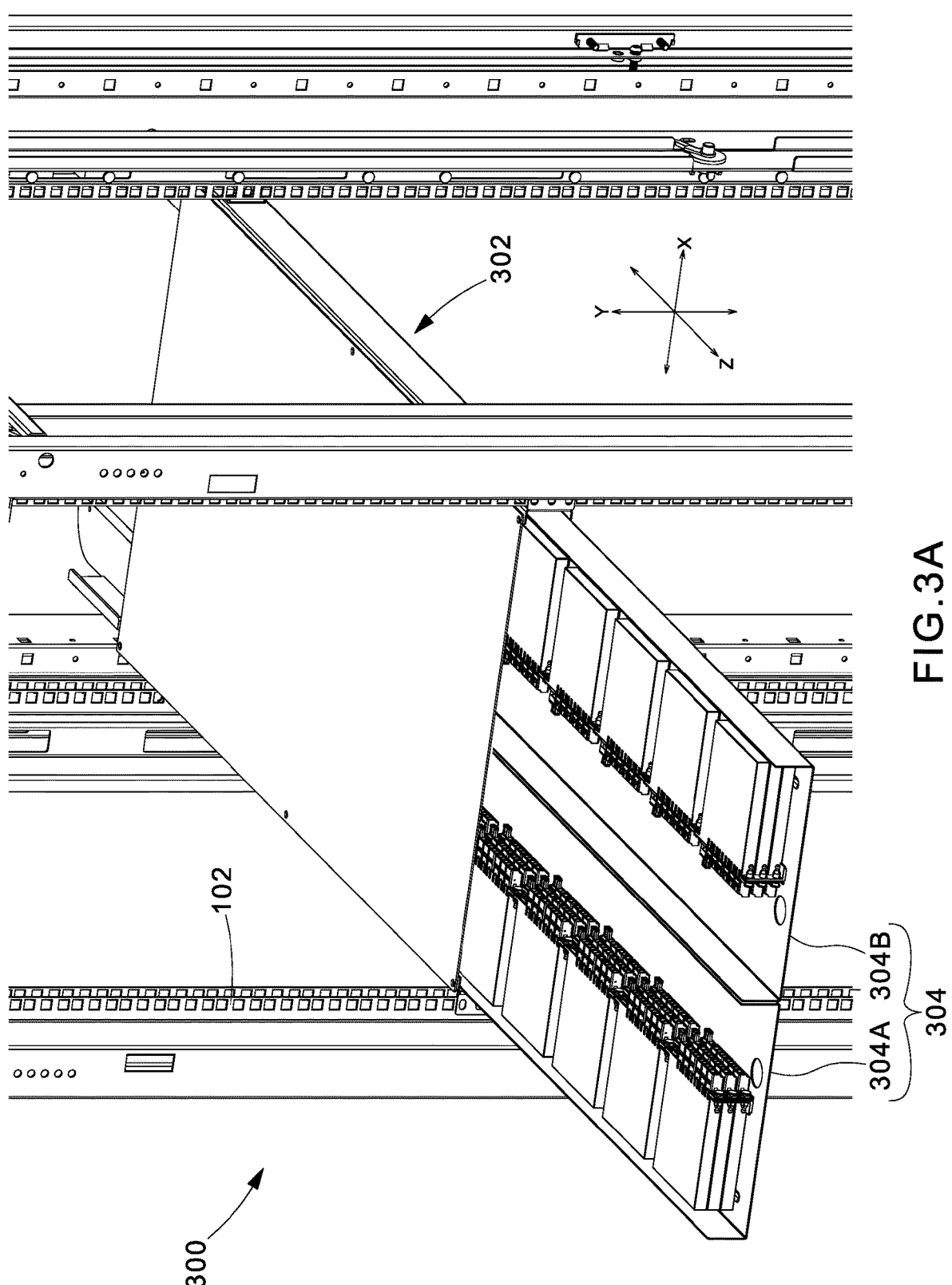
FIG. 3A illustrates a perspective partial view of a fiber management system including a tray having dual-adjacent tray bodies in accordance with the present disclosure.
Figure 3B:
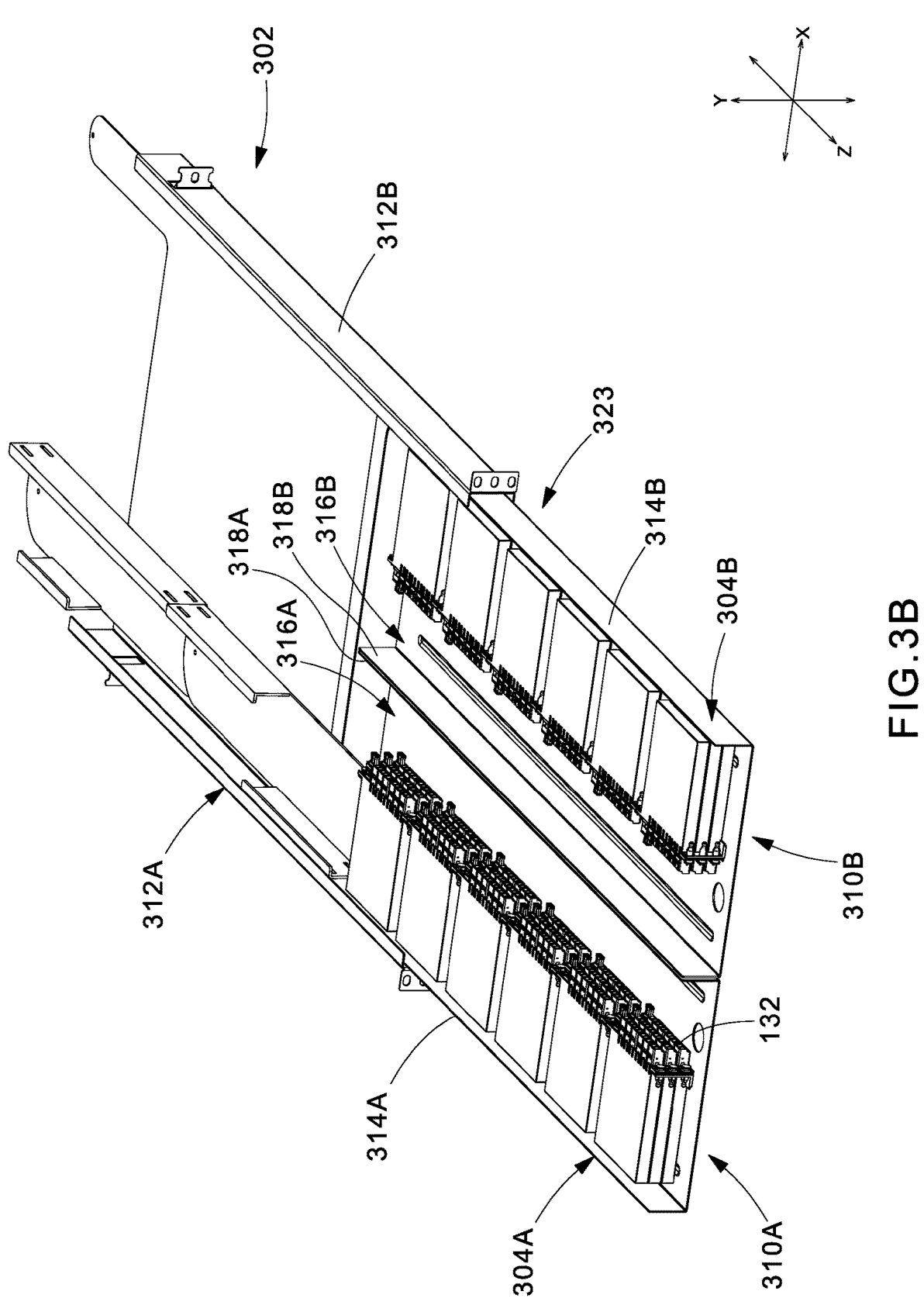
FIG. 3B illustrates a perspective view of the dual adjacent tray bodies of FIG. 3A in accordance with the present disclosure.
Figure 4A:
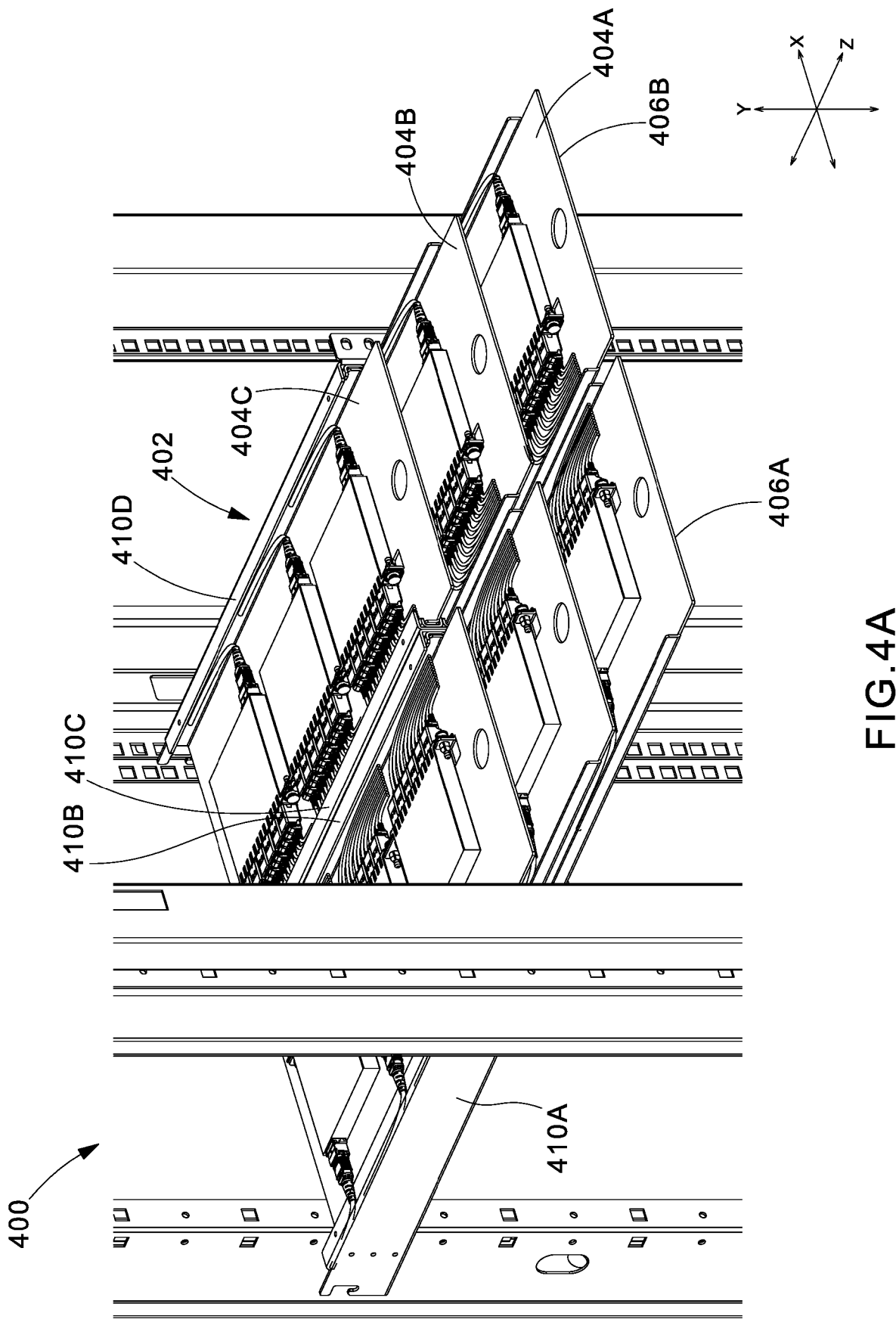
FIG. 4A illustrates a perspective partial view of a fiber management system including a tray having multiple dual-adjacent tray bodies, each supporting a single layer of cassettes arranged in accordance with the present disclosure.
Figure 4B:
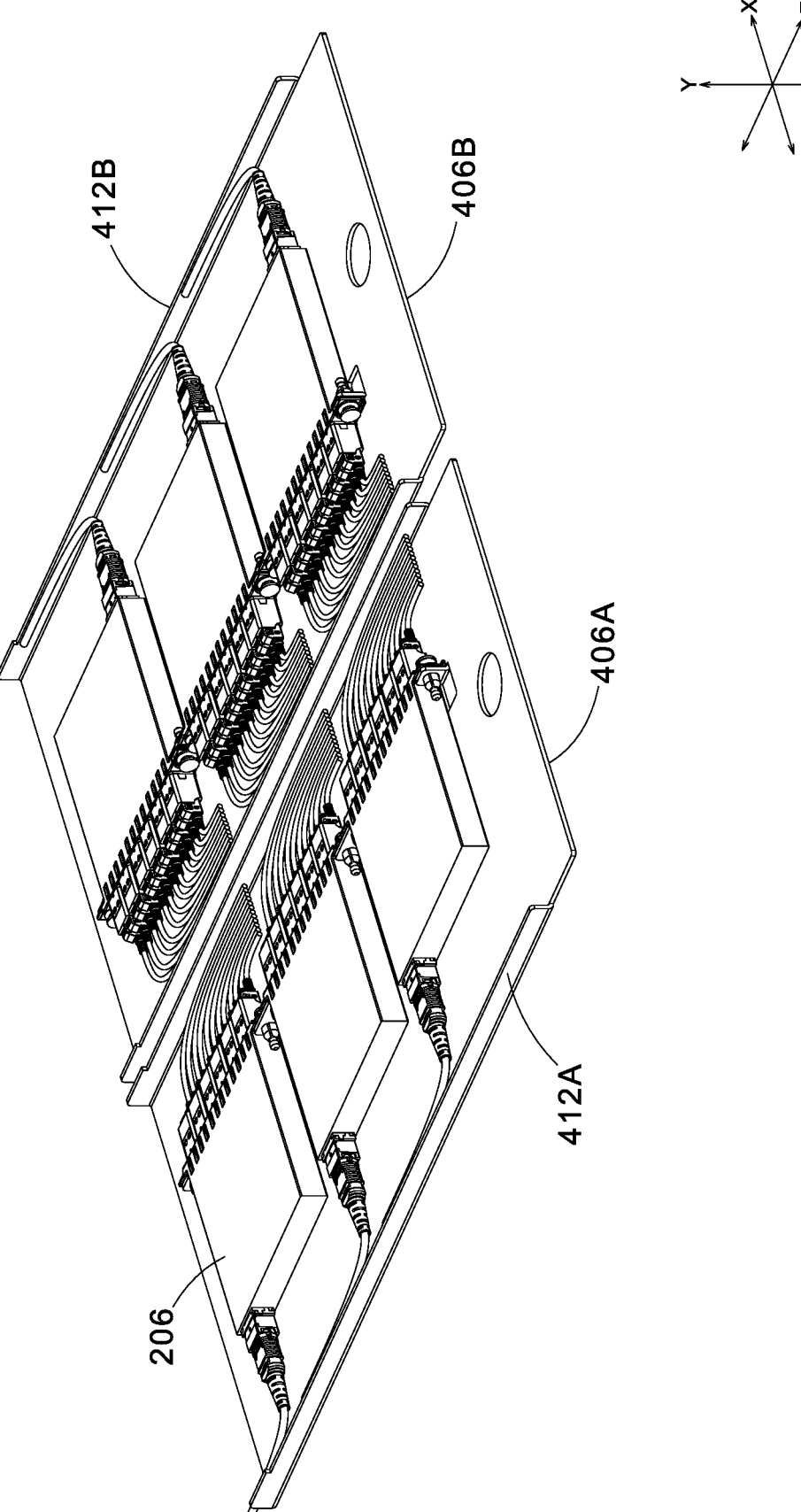
FIG. 4B illustrates a perspective view of a dual adjacent tray body of FIG. 4A in accordance with the present disclosure.

The dual-adjacent tray configuration of FIGS. 3A and 3B may also be implemented as part of a tray having multiple tray bodies similar to the embodiment of FIGS. 2A and 2B. Specifically, referring to FIGS. 4A and 4B, a fiber management system 400 includes a tray 402 having multiple tray bodies 404A, 404B, 404C (collectively "tray body 404") that fill up a 1 RU height, where each tray body 404 includes a first tray body 406A and a second tray body 406B arranged adjacent to and separate from the first tray body 406A. Stated differently, the first tray body 406A forms a left side of the tray body 404 and the second tray body 406B forms a right side of the tray body 404. The first tray body 406A and the second tray body 406B are connected to a set of rails 410A, 410B, 410C, 410D (collectively "rails 410") to be slidable along the Y-axis and slide in and out of the cabinet 102. Each tray body 404 includes the plurality of cassettes 206, which are arranged offset from outer sides 412A, 412B of the tray body 406A,406B in a similar manner as that of the cassettes 206 in FIGS. 2A, 2B.

The following describes additional variations and/or features that may be provided with the fiber management systems 100. It should be readily understood that these variations and/or features may also be applied to the fiber management systems 200, 300, and/or 400 and combinations thereof.

Figure 5:
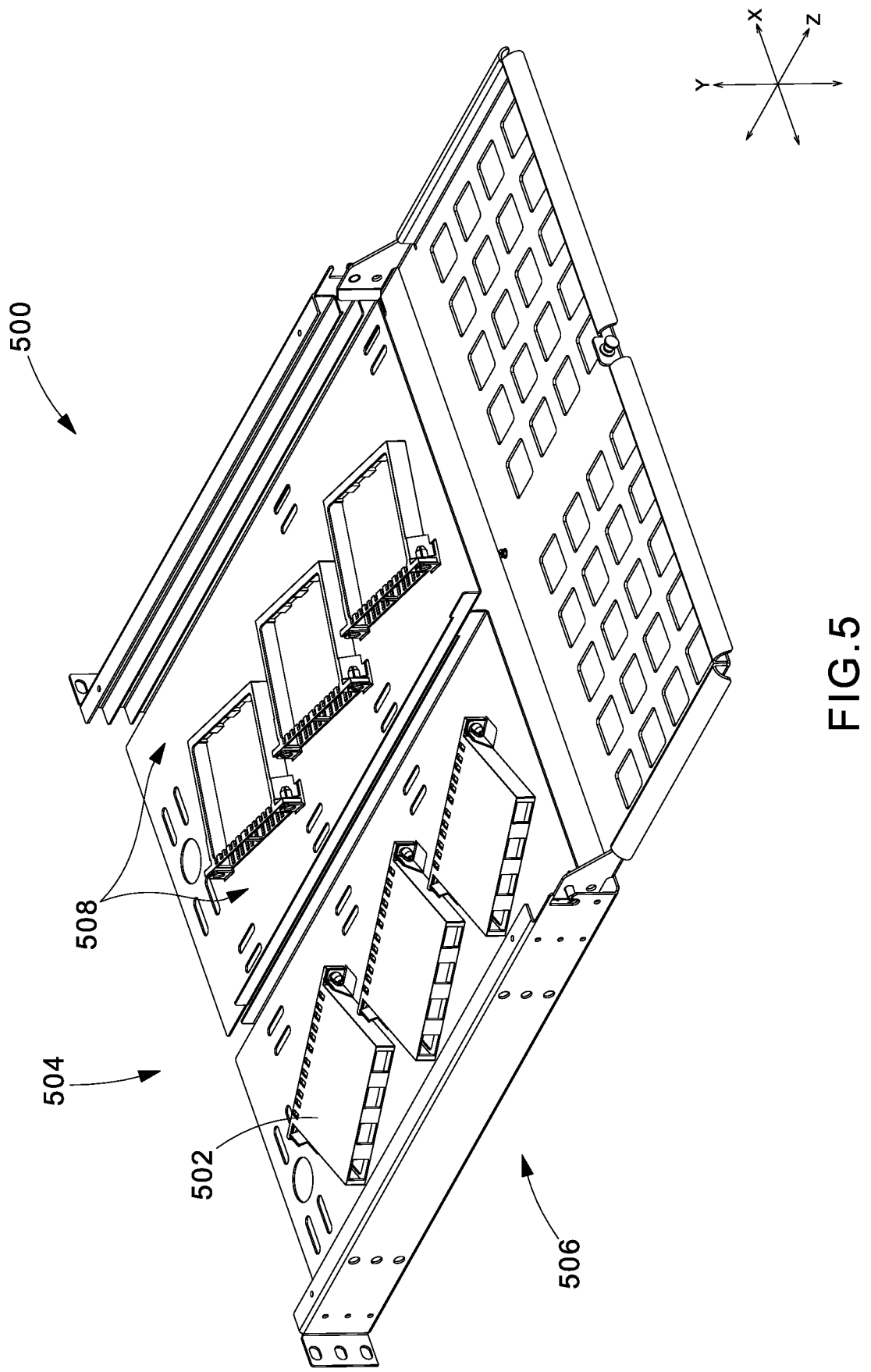
FIG. 5 illustrates a perspective view of a tray supporting a plurality of cassettes for a fiber management system, where the cassettes are arranged at an angle in accordance with the present disclosure.

In some variations, in lieu of the cassettes 106 being arranged to fully face the longitudinal portion 124 of the tray 104, the cassettes 106 may be provided at an angle to partially face the lateral portion 126 of the tray 104 along a non-orthogonal angle. In a non-limiting example, referring to FIG. 5, a tray 500 supports a plurality of cassettes 502 that are angled towards a lateral portion 504 (i.e., towards the width) and a longitudinal portion 506 (i.e., the depth) of the tray 500. In this configuration, gaps 508 defined between the cassette 502 and the tray 500 may be used to route cables that are connected to the cassette 502. Accordingly, while the cassettes 502 are partially facing the lateral portion 504, which aligns with the front and rear openings 116A, 116B of the cabinet 102, the depth of the tray 500 is still employed to accommodate more cassettes 502 than an arrangement in which the cassettes 502 fully face the later portion 504.

The cassettes 106 may be secured to the tray 104 and, if applicable, to each other, using different fastening mechanisms.

Figure 6:
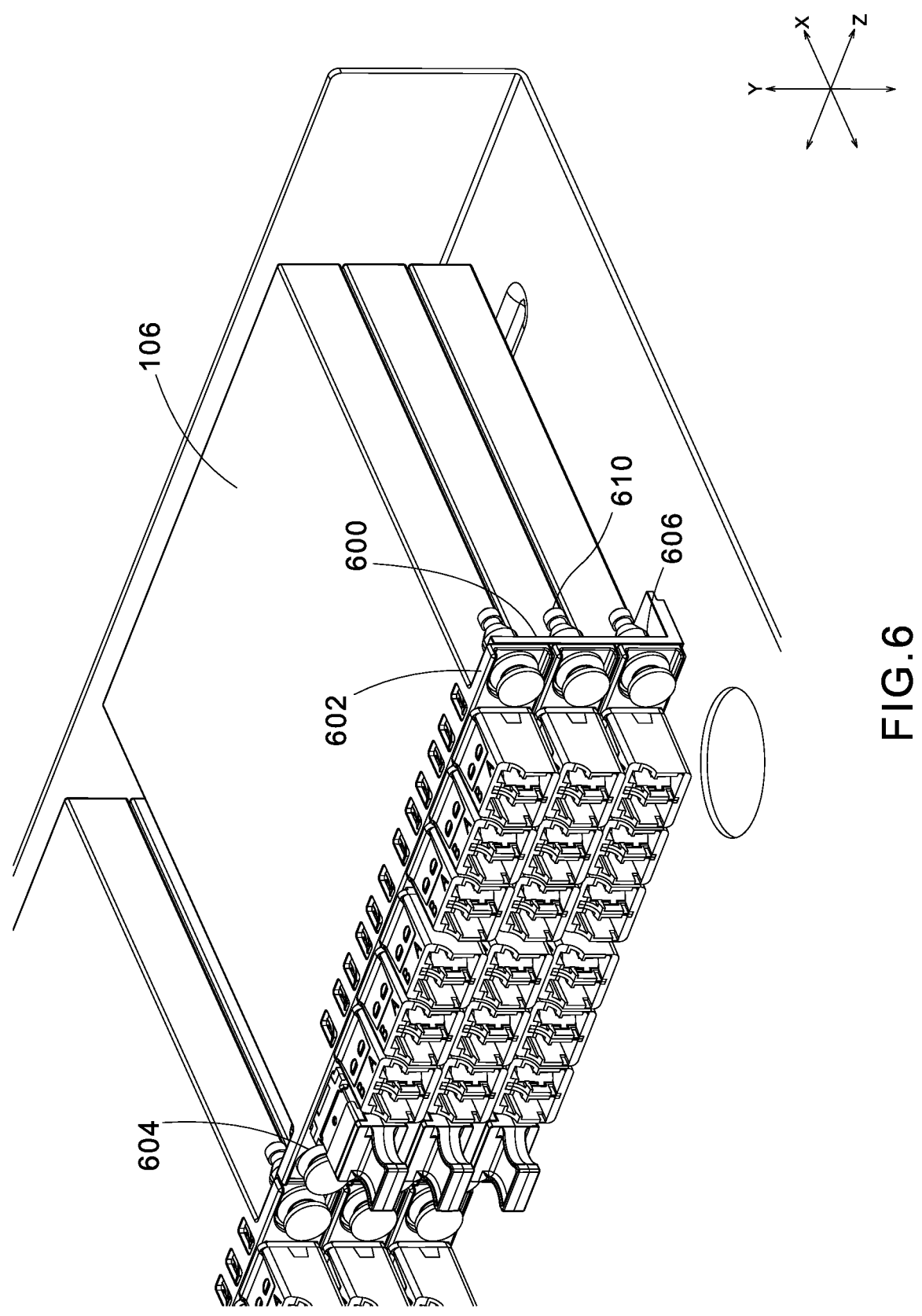
FIG. 6 illustrates a perspective view of a bracket securing a plurality of cassettes in a stacked configuration in accordance with the present disclosure.

In a non-limiting example, referring to FIG. 6, the cassettes 106 are stacked forming three layers of cassettes 106 and may be secured to one another and to the tray body 122 using a bracket 600. Specifically, in one form, each cassette 106 includes a brace 602 extending on either side of the cassette 106 and defining a hole 604. The bracket 600 having an "L" shape configuration defines a hole 606 for each cassette 106 to be secured to the bracket 600 (e.g., three holes for the three stacked cassettes 106). The holes 604 of the cassettes 106 align with the holes 606 of the bracket 600, and the cassette 106 is secured/connected to the bracket 600 using a fastener 610 such as, for example a Nylatch or other push-pin style fastener. Other fastening mechanisms may also be used, such as, but not limited to a bolt, a washer, and a nut.

In one form, the bracket 600 may be attached to the tray body 104 using a snap-in joint assembly. For example, the bracket 600 includes a snap-in lug provided at a base portion of the bracket 600 and aligns with an aperture defined in the tray body 104. The aperture is configured to receive the snap-in lug and form a snap-in joint when the lug is inserted into the aperture. The aperture may be provided as an indentation or as a through-hole. The bracket 600 may also be attached to the tray body 104 using rivets, soldering, adhesives, or other known attachment solutions.

Figure 7:
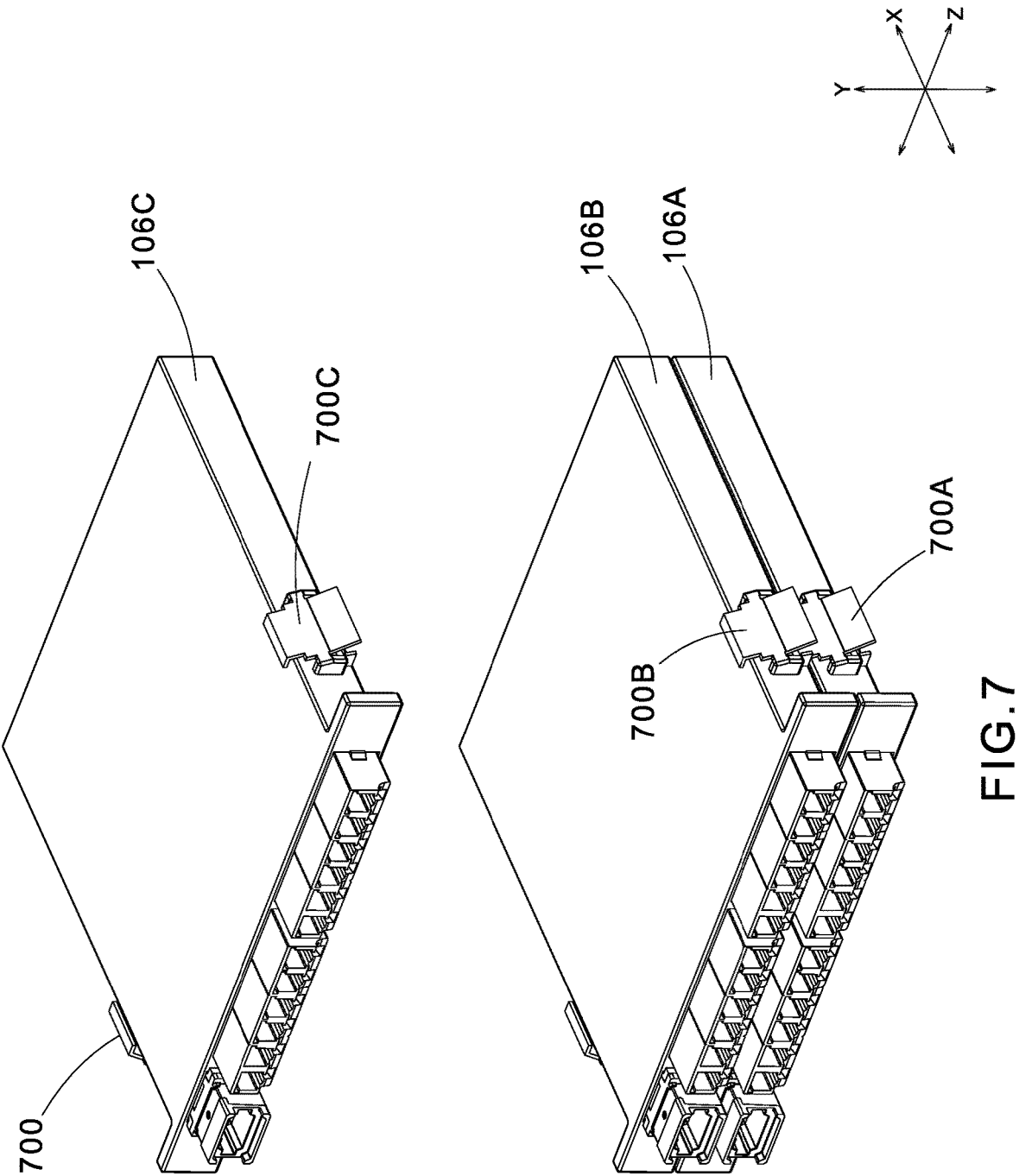
FIG. 7 illustrates a perspective view of a snap-in bracket securing multiple cassettes to a tray in accordance with the present disclosure.

In another example, the tray 104 and cassette 106 may be configured to have a snap-in geometry to be secured to the tray 104 using a snap-in bracket. Specifically, referring to FIG. 7, in addition to or in lieu of the bracket 600, a snap-in bracket 700 is configured to connect two cassettes 106 provided in a stacked configuration to each other and/or connect the cassette 106 to the tray 104. For example, a first snap-in bracket 700A connects a first cassette 106A to the tray 104, which has snap-in geometry such as a groove or slot to receive the first snap-in bracket 700A. A second snap-in bracket 700B connects the first cassette 106A to a second cassette 106B, and a third snap-in bracket 700C is provided to connect a third cassette 106C to the second cassette 106B. The snap-in bracket 700 are configured to be attachable to/detachable from the cassettes 106 and/or the tray 104.

Figure 8:
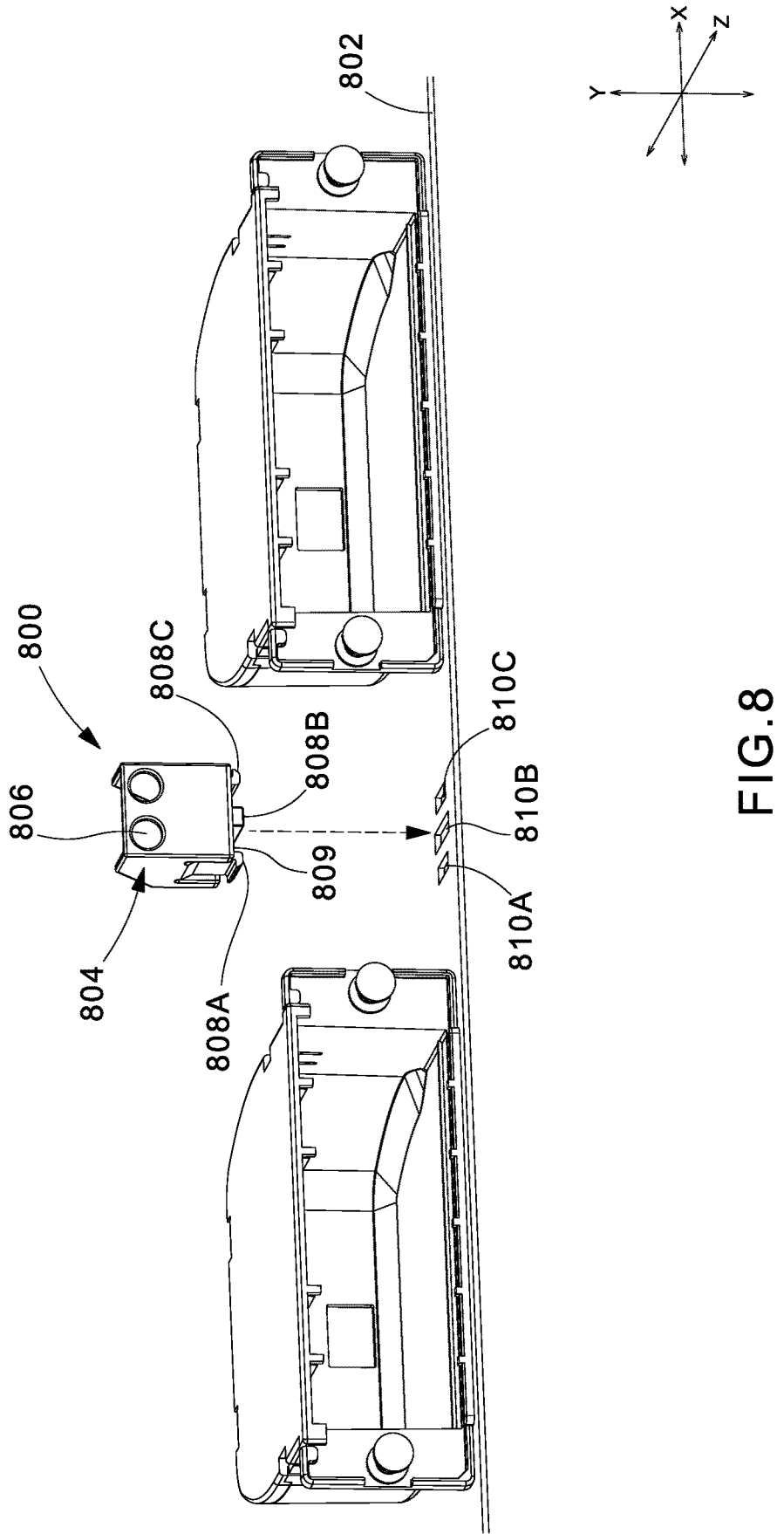
FIG. 8 illustrates a perspective view of a snap-connector to be connected to a tray in accordance with the present disclosure.

In some variations, the fiber management system 100 may have other components that are to be secured to the tray 104. In a non-limiting example, supports may be provided for different wiring to be routed to the cassettes 106. Referring to FIG. 8, a snap-lock connector 800 may be employed to support components, like the wiring, and secure the component to a platform 802, which may be a tray. In a non-limiting example, the snap-lock connector 800 may be used to mount a cassette (not shown) and/or attach to a cable management ring employed for managing cables. Specifically, an upper portion 804 of the snap-lock connector 800 may be configured in various suitable ways to attach to the component. For example, when mounting a cassette, the snap-lock connector 800 defines openings 806 that is configured to receive a grommet plunger assembly (not shown) employed to connect to a cassette.

In one form, the snap-in connector 800 is configured to attach to/detach from the platform 802. Specifically, the snap-in connector 800 includes snap-fit cantilever tabs 808A, 808B, 808C (collectively "tabs 808") at a bottom side 809 of the snap-in connector 800, and the platform 802 defines snap-in apertures 810A, 810B, 810C (collectively "apertures 810") to receive the tabs 808. Together the tabs 808 and the snap-in apertures 810 form a cantilever snap joint configured to secure the snap-in connector 800 to the platform 802 and inhibit the snap-in connector 800 from rotating once attached to the platform 802. The snap-in connector 800 may be detached from the platform 802 by applying force (e.g., inward pressure) to the tabs 808, where the force may be provided from the bottom and/or the sides of the tabs 808.

The snap-in connector 800 enables secure attachment of components without the use of tooling. The snap-in connector 800 may be orientated in various suitable direction and should not be limited to the example illustrated in the drawings.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fiber management system comprising:
a tray comprising:
  a set of rails;
  a tray body configured to slide along the set of rails, the tray body having a tray depth defined along a longitudinal portion extending in parallel with the set of rails and the tray body having a tray width defined along a lateral portion extending from a first side to a second side of the tray body; and
  a tray floor including a cable routing feature; and
a plurality of cassettes installed onto the tray floor, the plurality of cassettes including a first array of cassettes and a second array of cassettes, each of the cassettes having a plurality of ports at a first side of the cassette to support fiber optic adapters, wherein the first side of the first array of cassettes faces inward to face the cable routing feature and the first side of the second array of cassettes faces inward to face the cable routing feature such that the first array of cassettes are installed across from the second array of cassettes on the tray floor and the cable routing feature is positioned within a gap portion on the tray floor between the first array of cassettes and the second array of cassettes.

2. The fiber management system of claim 1, wherein the cable routing feature is a barrier plate.

3. The fiber management system of claim 1, wherein the first array of cassettes are arranged to be directly next to the first side of the tray body and the second array of cassettes are arranged to be directly next to the second side of the tray body.

4. The fiber management system of claim 1, wherein:
each cassette has a second side opposite of the first side, wherein a number of ports on the second side is less than a number of ports on the first side.

5. The fiber management system of claim 1, wherein the tray body comprises:
a first tray body, and
a second tray body arranged adjacent to and separate from the first tray body, wherein the first tray body and the second tray body are configured to independently slide from one another.

6. The fiber management system of claim 5, wherein the first array of cassettes are arranged on the first tray body, and the second array of cassettes are arranged on the second tray body.

7. The fiber management system of claim 1, wherein the first array of cassettes are arranged at an angle to have the first sides at a slant with the longitudinal portion of the tray body.

8. The fiber management system of claim 1, wherein the first array of cassettes are arranged in a single layer along the tray body.

9. The fiber management system of claim 1, further including a supplemental cassette stacked on top of a cassette included in the first array of cassettes to form a cassette stack.

10. The fiber management system of claim 9 further comprising a bracket connecting the supplemental cassette and the cassette included in the first array of cassettes that form the cassette stack.

11. The fiber management system of claim 9, further comprising:
a snap-in bracket connecting a cassette included in the first array of cassettes to the tray body.

12. The fiber management system of claim 1 further comprising:
a snap-in connector including a snap-in tab extending from a bottom end of the connector, wherein the tray body defines a snap-in aperture configured to receive and connect to the snap-in tab.

13. The fiber management system of claim 1, further comprising:
a second tray positioned above the tray, the second tray comprising:

a second set of rails; and a second tray body configured to independently slide from the tray within the second set of rails.

14. The fiber management system of claim 1, further comprising a cabinet defining a cabinet opening, wherein the tray is disposed in the cabinet and is configured to slide to extend past the cabinet opening.

15. A fiber management system comprising:

a cabinet defining an opening;

a tray comprising:

a set of rails;

a tray body configured to slide along the set of rails so that at least a portion of the tray body extends beyond the opening; and a tray floor including a cable routing feature; and a plurality of cassettes installed onto the tray floor, the plurality of cassettes including a first array of cassettes and a second array of cassettes, each of the cassettes having a plurality of ports at a first side of the cassette to support fiber optic adapters, wherein the first side of the first array of cassettes faces inward to face the cable routing feature and the first side of the second array of cassettes faces inward to face the cable routing feature such that the first array of cassettes are installed across from the second array of cassettes on the tray floor and the cable routing feature is positioned within a gap portion on the tray floor between the first array of cassettes and the second array of cassettes.

16. The fiber management system of claim 15, wherein the tray body comprises:

a first tray body, and a second tray body arranged adjacent to and separate from the first tray body, wherein the first tray body and the second tray body are configured to independently slide from one another.

17. The fiber management system of claim 16, wherein the first array of cassettes are arranged on the first tray body, and the second array of cassettes are arranged on the second tray body.

18. The fiber management system of claim 15, further including a supplemental cassette stacked on top of a cassette included in the first array of cassettes to form a cassette stack.

* * * * *